United States Patent
Zheng et al.

(10) Patent No.: US 11,249,545 B2
(45) Date of Patent: Feb. 15, 2022

(54) ELECTRONIC APPARATUS, SPATIAL POSITIONING SYSTEM AND METHOD THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Chao Zheng, Beijing (CN); Zhanshan Ma, Beijing (CN); Jiyang Shao, Beijing (CN); Jinbao Peng, Beijing (CN); Ziqiang Guo, Beijing (CN); Wenhong Tian, Beijing (CN); Haoran Jing, Beijing (CN); Zhiyu Sun, Beijing (CN); Zheng Ge, Beijing (CN); Yuhong Liu, Beijing (CN); Hao Zhang, Beijing (CN); Lili Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/824,914

(22) Filed: Mar. 20, 2020

(65) Prior Publication Data
US 2021/0034142 A1    Feb. 4, 2021

(51) Int. Cl.
G06F 3/01    (2006.01)

(52) U.S. Cl.
CPC .................. *G06F 3/011* (2013.01)

(58) Field of Classification Search
CPC ....................................... G06F 3/011
See application file for complete search history.

(56) References Cited

U.S. PATENT DOCUMENTS

| 2007/0206945 A1* | 9/2007 | DeLorme | G03B 41/00 396/332 |
| 2013/0068783 A1* | 3/2013 | Gasper | A61L 9/14 222/1 |
| 2015/0084517 A1* | 3/2015 | Ayala | G01J 5/04 315/152 |

(Continued)

FOREIGN PATENT DOCUMENTS

| CN | 104111446 A | 10/2014 |
| CN | 104571503 A | 4/2015 |

(Continued)

OTHER PUBLICATIONS

First Office Action dated Jan. 26, 2021 for Chinese Patent Application No. 201910845375, 23 pages.

*Primary Examiner* — Thanh Luu
(74) *Attorney, Agent, or Firm* — Dave Law Group LLC; Raj S. Dave (57) ABSTRACT

The present disclosure provides an electronic apparatus, a spatial positioning system and a method thereof. The electronic apparatus includes: a body having a central region and a peripheral region surrounding the central region; and a plurality of signal receiving components disposed in the peripheral region of the body. The signal receiving component includes a circuit board and a plurality of signal receiving devices located on the circuit board.

10 Claims, 6 Drawing Sheets

(56) References Cited

U.S. PATENT DOCUMENTS

| | | | |
|---|---|---|---|
| 2017/0105639 A1* | 4/2017 | Ma | A61B 5/02055 |
| 2017/0188462 A1* | 6/2017 | Shui | H05K 1/028 |
| 2018/0306898 A1 | 10/2018 | Pusch et al. | |
| 2020/0018469 A1* | 1/2020 | Kohen | F21V 21/002 |

FOREIGN PATENT DOCUMENTS

| | | |
|---|---|---|
| CN | 109407834 A | 3/2019 |
| WO | 2012/027597 A2 | 3/2012 |

* cited by examiner

```
"lighthouse_config" : {
    "channelMap" : [1, 2, 3, 4, 5, 6, 7, 8, 9, 10, 11, 12, 13, 14, 16, 17, 18, 19, 20, 21, 22, 23, 24, 25, 26, 27, 28, 0, 29 ],
    "modelNormals" : [
        [ 0.460984439, -0.570780754, -0.67948705 ], [ 0.444021076, -0.843439996, 0.302414328 ],
        [ 0.791155219, 0.258850783, -0.55413872 ], [ 0.522925436, 0, 0.852378488 ],
        [ 0.791155219, -0.258850783, -0.55413872 ], [ 0.444021076, 0.843439996, 0.302414328 ],
        [ 0.460984439, 0.570780754, -0.67948705 ], [ 0, -0.573616683, 0.819123864 ],
        [ -0.709386706, -0.573589265, 0.40959233 ], [ -0.526578724, -0.573576808, -0.627474666 ],
        [ 0.170305088, -0.573617101, -0.801223874 ],[ -0.170305088, -0.573617101, -0.801223874 ],
        [ 0.526578724, -0.573576808, -0.627474666 ], [ 0.709386706, -0.573589265, 0.40959233 ],
        [ 0.709386706, 0.573589265, 0.40959233 ],[ -0.170305088, 0.573617101, -0.801223874 ],
        [ 0.170305088, 0.573617101, -0.801223874 ],[ -0.526578724, 0.573576808, -0.627474666 ],
        [ -0.709386706, 0.573589265, 0.40959233 ], [ 0, 0.573616683, 0.819123864 ],
        [ -0.460984439, 0.570780754, -0.67948705 ], [ -0.444021076, 0.843439996, 0.302414328 ],
        [ -0.791155219, -0.258850783, -0.55413872 ],[ -0.522925436, 0, 0.852378488 ],
        [ -0.791155219, 0.258850783, -0.55413872 ],[ -0.444021076, -0.843439996, 0.302414328 ],
        [ -0.460984439, -0.570780754, -0.67948705 ],[ 0.500011027, 0, 0.86601907 ],
        [ -0.500011027, 0, 0.86601907 ]],
    "modelPoints" : [
        [ 0.0932699367, -0.0197631959, -0.001267844 ],[ 0.101796865, -0.0176498219, 0.014945372 ],
        [ 0.1031937, -0.0122555662, 0.006901123998 ],[ 0.105244711, 0.000175742709, 0.0208937228 ],
        [ 0.102716289, 0.0124061713, 0.00647194311 ], [ 0.101222247, 0.0180906821, 0.0149221933 ],
        [ 0.0929411948, 0.0198698714, -0.00157212431 ], [ -0.000285933667, -0.0484695099, 0.0316810906 ],
        [ -0.0539822914, -0.0483968109, 0.0247565191 ],[ -0.0517479107, -0.0491533279, 0.0134827662 ],
        [ -0.0398703106, -0.0483564101, 0.0107697891 ],[ 0.0394779369, -0.0484013893, 0.0108658671 ],
        [ 0.0513537042, -0.0484327115, 0.0138859162 ],[ 0.0537780412, -0.0485757925, 0.0249306429 ],
        [ 0.0539722405, 0.0478701107, 0.0253579579 ],[ 0.0395493433, 0.0482023023, 0.0113739325 ],
        [ -0.0394962616, 0.0486783497, 0.0106487814 ],[ -0.0514067039, 0.0484293215, 0.0135195497 ],
        [ -0.0538894609, 0.0483644307, 0.0244576372 ],[ -0.00054321409, 0.0482032113, 0.0320712999 ],
        [ -0.0933437049, 0.0195717588, -0.00163211732 ], [ -0.101296917, 0.0178991947, 0.0149301011 ],
        [ -0.102920152, 0.012278581, 0.00689726416 ],[ -0.104926288, 0.00028834556, 0.0212777741 ],
        [ -0.103150524, -0.0122077418, 0.00675839605 ], [ -0.101063259, -0.017901415, 0.0153610511 ],
        [ -0.0934174433, -0.0196570605, -0.00135240331 ],[ 0.0851973817, -3.68356486e-05, 0.0442390889 ],
        [ -0.0843310282, 0.00011633923, 0.0439875349 ]]},
```

ELECTRONIC APPARATUS, SPATIAL POSITIONING SYSTEM AND METHOD THEREOF

CROSS-REFERENCE TO RELATED APPLICATIONS

This application claims priority of China Patent Application No. 201910845375.0, filed on Sep. 4, 2019, the entire content of which is incorporated herein by reference as part of this application.

FIELD

The present disclosure relates to the technical field of spatial positioning, and in particular, to an electronic apparatus, a spatial positioning system and a method thereof.

BACKGROUND

A virtual reality (VR) apparatus or an augmented reality (AR) apparatus is an electronic apparatus that constructs a virtual world or combines virtual world and real world. VR apparatuses provide an immersive sensation to the user through a processor that generates an interactive three-dimensional environment. AR apparatuses combine the virtual world with the real world to achieve interaction. During use, both the VR apparatus and the AR apparatus need to accurately locate their own spatial position (for example, the position in a preset room).

BRIEF DESCRIPTION

The present disclosure provides an electronic apparatus, a spatial positioning system and a method thereof.

According to a first aspect of the present disclosure, an electronic apparatus is provided. The electronic apparatus includes: a body having a central region and a peripheral region surrounding the central region; and a plurality of signal receiving components disposed in the peripheral region of the body, wherein the signal receiving component includes a circuit board and a plurality of signal receiving devices located on the circuit board.

In an embodiment of the present disclosure, the plurality of signal receiving devices are disposed on the circuit board and towards different directions.

In an embodiment of the present disclosure, in the signal receiving component, mounting planes of at least any four of the signal receiving devices are not located on the same plane.

In an embodiment of the present disclosure, in the signal receiving component, an angle between the mounting planes of the adjacent signal receiving devices is greater than or equal to 120 degrees.

In an embodiment of the present disclosure, the mounting plane of the signal receiving device is a signal receiving surface of the signal receiving device.

In an embodiment of the present disclosure, the plurality of signal receiving components include a first signal receiving component, a second signal receiving component, a third signal receiving component, and a fourth signal receiving component. The first signal receiving component and the second signal receiving component are oppositely disposed in the peripheral region along a first direction, and the third signal receiving component and the fourth signal receiving component are oppositely disposed in the peripheral region along a second direction, wherein the first direction and the second direction are perpendicular to each other.

In an embodiment of the present disclosure, the first signal receiving component and the second receiving component each include a first preset number of signal receiving devices. The signal receiving device in the first signal receiving component and the signal receiving device in the second receiving component are symmetrical with respect to a center line penetrating through the center region along the second direction.

In an embodiment of the present disclosure, the first preset number is 7.

In an embodiment of the present disclosure, the third signal receiving component and the fourth receiving component each include a second preset number of the signal receiving devices. The signal receiving device in the third signal receiving component and the signal receiving device in the fourth receiving component are symmetrical with respect to a center line penetrating through the center region along the first direction.

In an embodiment of the present disclosure, the electronic apparatus further includes a control module coupled to the plurality of signal receiving components. The signal receiving device is configured to receive a source signal emitted by a signal emitting source and generate a first signal according to the received source signal. The circuit board is configured to transmit the first signal to the control module. The control module is configured to obtain spatial position information and/or motion information of the electronic apparatus according to the first signal.

In an embodiment of the present disclosure, the second preset number is 8.

In an embodiment of the present disclosure, the signal receiving component is removably attached to the body.

In an embodiment of the present disclosure, the signal receiving device includes a photodiode.

In an embodiment of the present disclosure, the circuit board includes a flexible printed circuit board.

In an embodiment of the present disclosure, the electronic apparatus is virtual reality glasses. The first signal receiving component and the second receiving component each include a first preset number of signal receiving devices. The signal receiving device in the first signal receiving component and the signal receiving device in the second receiving component are symmetrical with respect to a center line penetrating through the center region along the second direction. The first preset number is 7. The third signal receiving component and the fourth receiving component each include a second preset number of signal receiving devices. The signal receiving device in the third signal receiving component and the signal receiving device in the fourth receiving component are symmetrical with respect to a center line penetrating through the center region along the first direction. The second preset number is 8. The electronic apparatus further includes a control module coupled to the plurality of signal receiving components. The signal receiving device is configured to receive a source signal emitted by a signal emitting source and generate a first signal according to the received source signal. The circuit board is configured to transmit the first signal to the control module. The control module is configured to obtain spatial position information and/or motion information of the electronic apparatus according to the first signal. The signal receiving component is removably attached to the body. The signal receiving device includes a photodiode. The circuit board includes a flexible printed circuit board.

According to a second aspect of the present disclosure, a spatial positioning system is provided. The spatial positioning system includes: a signal emitting source configured to emit a source signal; and the electronic apparatus according to the above embodiments.

In an embodiment of the present disclosure, the source signal includes an optical signal, an electrical signal, or an acoustic signal.

According to a third aspect of the present disclosure, a method for performing spatial positioning using the electronic apparatus described in the above embodiments is provided. The method includes: receiving a source signal emitted by a signal emitting source; generating a first signal according to the received source signal; and obtaining spatial position information and/or motion information of the electronic apparatus according to the first signal.

In an embodiment of the present disclosure, the method further includes: before obtaining the spatial position information and/or the motion information of the electronic apparatus according to the first signal, obtaining initial position information and an initial orientation information of the electronic apparatus. Obtaining the spatial position information and/or the motion information of the electronic apparatus according to the first signal includes: obtaining the spatial position information and/or the motion information of the electronic apparatus according to an amplitude and a generating time of the first signal, and the initial position information and the initial orientation information of the electronic apparatus.

Adaptive and further aspects and scope will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

In order to more clearly illustrate the technical solutions of the embodiments of the present disclosure, the drawings that are used in the description of the embodiments of the present disclosure will be briefly introduced below. Obviously, the drawings in the following description are only some embodiments of the present disclosure. For those skilled in the art, other drawings can be obtained based on these drawings without paying creative labor.

FIG. 5 shows data representing positions and orientations of signal receiving devices according to an embodiment of the present disclosure.

Corresponding reference numerals indicate corresponding parts or features throughout the several views of the drawings.

DETAILED DESCRIPTION

As used herein and in the appended claims, the singular form of a word includes the plural, and vice versa, unless the context clearly dictates otherwise. Thus, the references "a", "an", and "the" are generally inclusive of the plurals of the respective terms. Similarly, the words "comprise", "comprises", and "comprising" are to be interpreted inclusively rather than exclusively. Likewise, the terms "include", "including" and "or" should all be construed to be inclusive, unless such a construction is clearly prohibited from the context. The term "example" used herein, particularly when followed by a listing of terms, is merely exemplary and illustrative and should not be deemed to be exclusive or comprehensive.

Additionally, further to be noted, when the elements and the embodiments thereof of the present application are introduced, the articles "a/an", "one", "the" and "said" are intended to represent the existence of one or more elements. Unless otherwise specified, "a plurality of" means two or more. The expressions "comprise", "include", "contain" and "have" are intended as inclusive and mean that there may be other elements besides those listed. The terms such as "first" and "second" are used herein only for purposes of description and are not intended to indicate or imply relative importance and the order of formation.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

Exemplary embodiments will now be described more fully with reference to the accompanying drawings.

Currently, accurate positioning is performed through multiple sensors set on a VR apparatus or an AR apparatus. Specifically, the positioning of the VR apparatus or the AR apparatus is achieved according to a signal received by the sensor from a signal emitting source and time information when the signal is received. However, due to these sensors are evenly distributed on a flexible printed circuit board (FPC), if the sensor is damaged, the entire FPC needs to be replaced, which will lead to extremely inconvenient maintenance and unnecessary waste.

To solve the above problems, an embodiment of the present disclosure provides an electronic apparatus.

Figure 1:
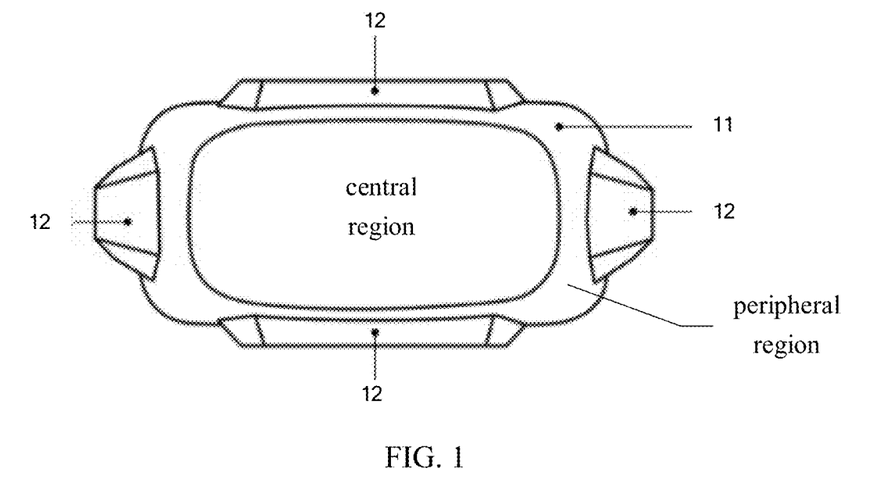
FIG. 1 shows a schematic structural diagram of an electronic apparatus according to an embodiment of the present disclosure.
Figure 2:
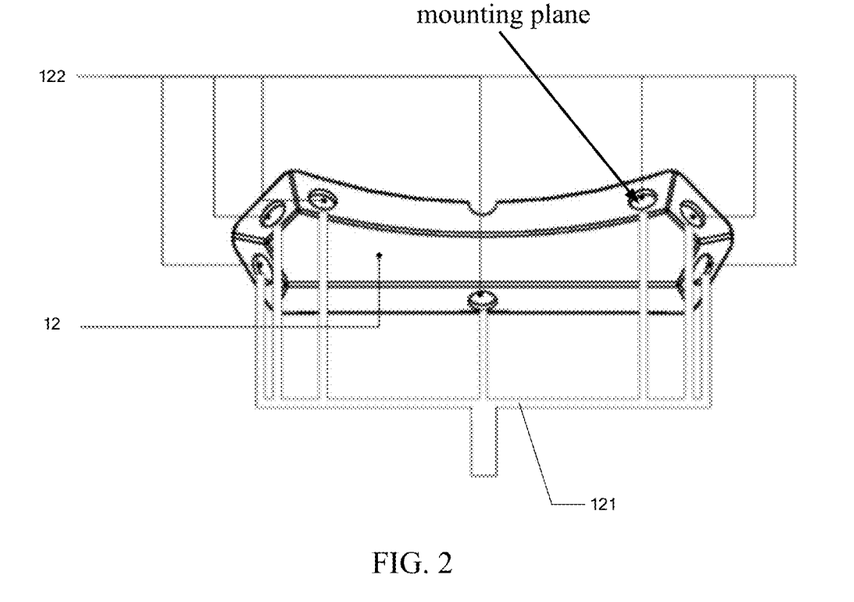
FIG. 2 shows a schematic structural diagram of a signal receiving component according to an embodiment of the present disclosure.

FIG. 1 shows a schematic structural diagram of an electronic apparatus according to an embodiment of the present disclosure. FIG. 2 show a schematic structural diagram of a signal receiving component according to an embodiment of the present disclosure.

Referring to FIG. 1, the electronic apparatus may include a body 11, a plurality of signal receiving components 12, and a control module. The body 11 has a central region and a peripheral region surrounding the central region. The plurality of signal receiving components 12 are disposed in the peripheral region of the body 11 and are respectively coupled to the control module. Referring to FIG. 2, the signal receiving component 12 includes a circuit board 121 and a plurality of signal receiving devices 122 located on the circuit board 121.

In an exemplary embodiment of the present disclosure, the signal receiving device 122 is configured to receive a source signal emitted by a signal emitting source and generate a first signal according to the received source signal. The circuit board 121 is configured to transmit the first signal to the control module. The control module is configured to obtain the spatial position information and/or the motion information of the electronic apparatus according to the first signal.

In an exemplary embodiment of the present disclosure, the body 11 may be, for example, a helmet or a fuselage housing of a VR/AR apparatus.

As an example, the circuit board 121 may include a flexible printed circuit board (FPC).

In an exemplary embodiment of the present disclosure, the control module may be, for example, a processor.

In an exemplary embodiment of the present disclosure, a distance between adjacent signal receiving devices 122 in the signal receiving component 12 is greater than a preset threshold. In practical applications, in order to improve accuracy of positioning, the distance between adjacent signal receiving devices 122 can be as large as possible. The preset threshold may be determined according to an actual situation, which is not specifically limited herein.

In an exemplary embodiment of the present disclosure, as shown in FIG. 2, the plurality of signal receiving devices are disposed on a flexible printed circuit board and towards different directions. The flexible printed circuit board is coupled to the control module.

In an exemplary embodiment of the present disclosure, referring to FIG. 2, the mounting planes of at least any four of signal receiving devices 122 are not located on the same plane.

In an exemplary embodiment of the present disclosure, in the signal receiving component 12, an angle between mounting planes of adjacent signal receiving devices 122 is greater than or equal to 120 degrees. For example, the angle may be an angle between plane normal vectors of adjacent signal receiving devices. In order to improve accuracy of positioning, for example, the angle between the mounting planes can be as large as possible. Those skilled in the art may select according to actual needs, which is not specifically limited herein.

In an exemplary embodiment of the present disclosure, the mounting plane of the signal receiving device 122 may be, for example, a signal receiving surface of the signal receiving device 122.

As an example, the signal receiving device 122 may include, for example, a photodiode. The photodiode is used to receive an optical signal and convert the optical signal into an electrical signal (for example, the first signal as described above). In addition, when the signal receiving device 122 is a photodiode, the mounting plane may be a light receiving surface of the photodiode.

In an embodiment of the present disclosure, the number N of the signal receiving components 12 of the electronic apparatus may be set according to an actual situation. For example, N can be 4, 6, or 8. That is, in an embodiment of the present disclosure, the signal receiving devices 122 are divided into N groups, that is, N signal receiving components 12. Each signal receiving component 12 corresponds to a flexible circuit board 121, which is coupled to a group of signal receiving devices 122.

Figure 3:
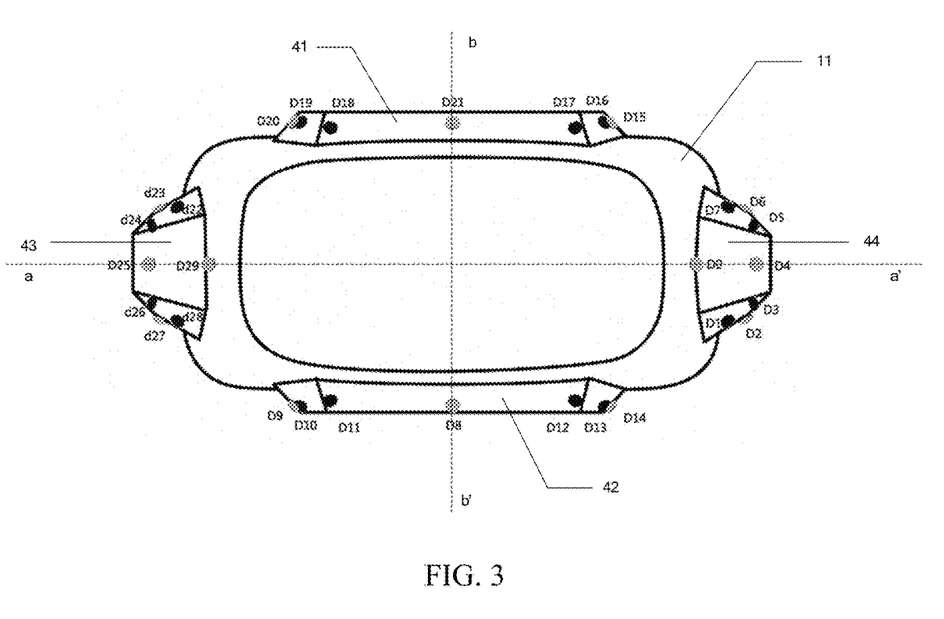
FIG. 3 shows a schematic diagram of a distribution of the signal receiving devices on a signal receiving component according to an embodiment of the present disclosure.

FIG. 3 shows a schematic diagram of a distribution of signal receiving devices on a signal receiving component according to an embodiment of the present disclosure.

Referring to FIG. 3, in an exemplary embodiment of the present disclosure, the plurality of signal receiving components 12 may include a first signal receiving component 41, a second signal receiving component 42, a third signal receiving component 43, and a fourth signal receiving component 44. The first signal receiving component 41 and the second signal receiving component 42 are oppositely disposed in the peripheral region along a first direction. The third signal receiving component 43 and the fourth signal receiving component 44 are oppositely disposed in the peripheral region along a second direction. The first direction and the second direction are perpendicular to each other.

In FIG. 3, the first direction is a vertical direction, and the second direction is a horizontal direction. The first signal receiving component 41, the second signal receiving component 42, the third signal receiving component 43 and the fourth signal receiving component 44 are respectively disposed on the upper side, lower side, left side and right side of the body 11. It should be understood that the illustration of FIG. 3 is merely exemplary and should not be considered as a limit to the present disclosure.

In an exemplary embodiment of the present disclosure, referring to FIG. 3, the first signal receiving component 41 and the second receiving component 42 each include a first preset number of signal receiving devices 122. The signal receiving device 122 in the first signal receiving component 41 and the signal receiving device 122 in the second receiving component 42 are symmetrical with respect to a center line aa' penetrating through the center region along the second direction.

Specifically, the position and orientation of the signal receiving device 122 in the first signal receiving component 41 and the position and orientation of the signal receiving device 122 in the second receiving component 42 are symmetrical with respect to the center line aa' penetrating through the center region along the second direction.

As an example, the first preset number may be 7. It should be understood that those skilled in the art may set the first preset number according to actual situation.

In an exemplary embodiment of the present disclosure, referring to FIG. 3, the third signal receiving component 43 and the fourth receiving component 44 each include a second preset number of signal receiving devices 122. The signal receiving device 122 in the third signal receiving component 43 and the signal receiving device 122 in the fourth receiving component 44 are symmetrical with respect to a center line bb' penetrating through the center region along the first direction.

Specifically, the position and orientation of the signal receiving device 122 in the third signal receiving component 43 and the position and orientation of the signal receiving device 122 in the fourth receiving component 44 are symmetrical with respect to the center line bb' penetrating through the center region along the first direction.

As an example, the second preset number may be 8. It should be understood that those skilled in the art may set the second preset number according to actual situation.

In addition, since a single signal receiving device cannot recognize the movement of an electronic apparatus in space, in existing algorithms, spatial positioning must be implemented by a plurality of signal receiving devices of different positions and orientations. Therefore, the position and orientation of the signal receiving device will greatly affect the recognition accuracy of spatial positioning.

In an embodiment of the present disclosure, by providing four signal receiving components 12 in the electronic apparatus, each of which has a plurality of signal receiving devices 122 having different positions and orientations, the electronic apparatus can realize an excellent spatial positioning performance.

It should be noted that in FIG. 3, the black dots represent that the signal receiving device is located on the back of the electronic apparatus, which is not visible. The gray dots represent that the signal receiving device is on the front of the electronic apparatus, which is visible.

In an exemplary embodiment of the present disclosure, referring to FIG. 3, the first signal receiving component 41 includes 7 sensors D15, D16, D17, D18, D19, D20, and D21. The second signal receiving component 42 includes 7 sensors D8, D9, D10, D11, D12, D13, D14. The third signal receiving component 43 includes 8 sensors D22, D23, D24, D25, D26, D27, D28, and D29. The fourth signal receiving component 44 includes 8 sensors D0, D1, D2, D3, D4, D5, D6, D7.

Figure 4:
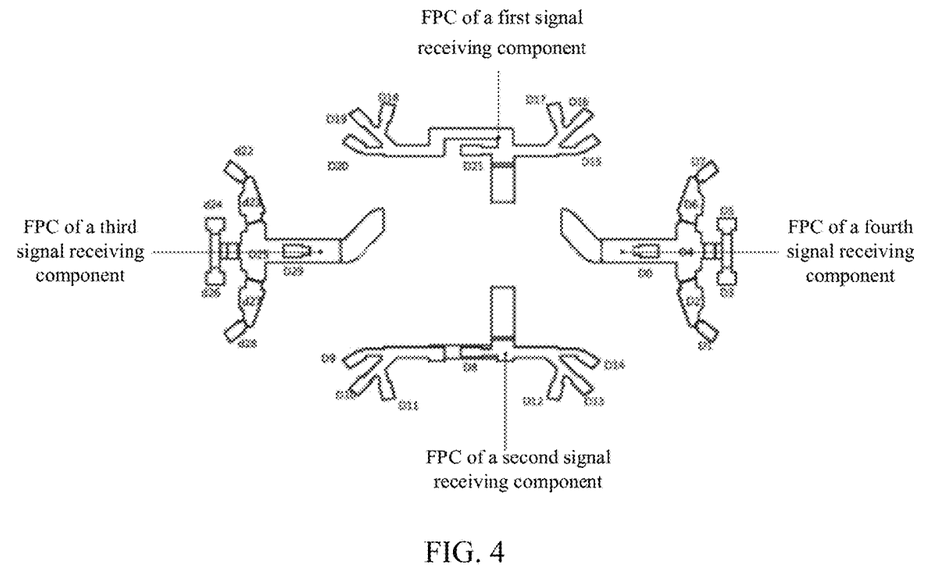
FIG. 4 shows a schematic diagram of a distribution of the signal receiving devices on a flexible printed circuit board according to an embodiment of the present disclosure.

FIG. 4 shows a schematic diagram of a distribution of signal receiving devices on a flexible printed circuit board according to an embodiment of the present disclosure. Referring to FIG. 4, each signal receiving component 12 is provided with a flexible printed circuit board. The one flexible printed circuit board is coupled to a plurality of signal receiving devices. Thus, if one signal receiving device is damaged, it is only necessary to replace the corresponding flexible printed circuit board. Compared with the prior art, the structure of the embodiments of the present disclosure can improve maintenance convenience and reduce maintenance costs.

FIG. 5 shows data representing positions and orientations of signal receiving devices according to an embodiment of the present disclosure. Referring to FIG. 5, JavaScript Object Notation (JSON) format is used to represent the spatial orientation and position data of the signal receiving device. The object corresponding to the spatial orientation and position is "lighthouse_config", and its data is represented as follows: "lighthouse_config":

{"channelMap": [ . . . ], "modelNormals": [ . . . ], "modelPoints": [ . . . ]},

This object contains 3 arrays. "channelMap" represents an array of sensor (i.e., signal receiving device) port numbers. The coordinate values of the array elements correspond to the electrical channels coupled to the sensor. "modelNormals" represents an array of unit vectors that are perpendicular to the light receiving surface of the photodiode (i.e., the signal receiving device). The coordinate values of the array elements represent the orientation of the sensor. "modelPoints" represents an array of the center position of the photosensitive region of the sensor. The coordinate values of the array elements represent the position of the sensor. The coordinate value is in meters. It should be noted that these coordinates can be a rectangular coordinate system with the middle point of the line connecting the two eyes in the electronic apparatus (VR/AR apparatus) as the origin.

In addition, a method for determining whether the sensor tracking recognition is stable may adopt an error factor analysis method. The error factors may include pose rotation errors and pose translation errors. Generally, pose rotation error and pose translation error need to be less than 60% at the same time, so as to achieve good tracking.

Figure 6:
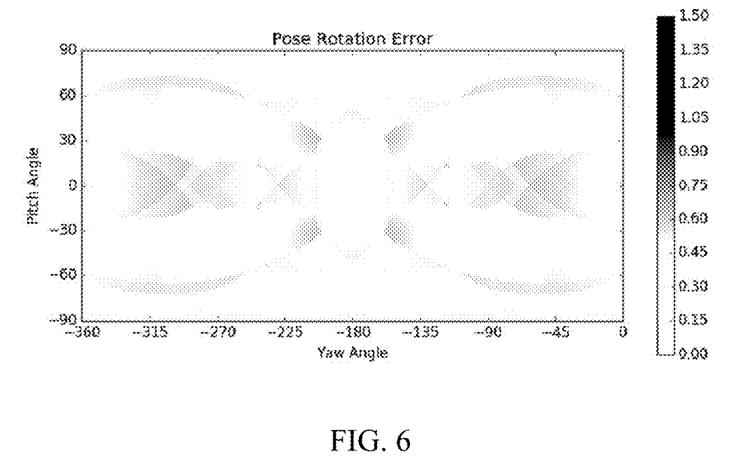
FIG. 6 shows a simulation diagram of pose rotation error according to an embodiment of the present disclosure.
Figure 7:
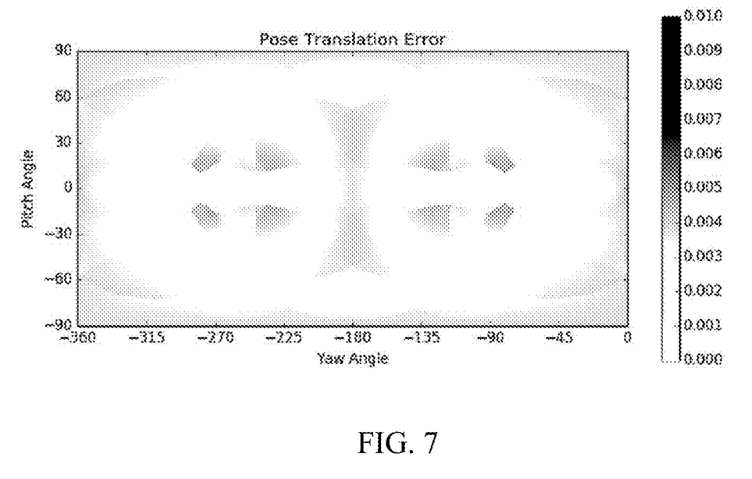
FIG. 7 shows a simulation diagram of pose translation error according to an embodiment of the present disclosure.

FIG. 6 shows a simulation diagram of a pose rotation error according to an embodiment of the present disclosure. FIG. 7 shows a simulation diagram of a pose translation error according to an embodiment of the present disclosure.

Referring to FIG. 6, the maximum pose rotation error is 0.9. The rotation errors in all directions are less than 60% (a range of 0-1.5). Referring to FIG. 7, the maximum pose translation error is 0.006. The translation errors in all directions are less than 60% (a range of 0-0.01, 60%).

According to the above simulation data and actual prototype verification, the electronic apparatus provided by the embodiments of the present disclosure can achieve high-accuracy positioning and tracking performance. In addition, by reasonably arranging the positions and orientations of the sensors, the electronic apparatus can achieve a high-accuracy spatial positioning performance of 360°.

In an embodiment of the present disclosure, the signal receiving component 12 may be removably attached to the body 11 or fixedly provided (e.g., welded, etc.) on the body 11. Further, in an exemplary embodiment of the present disclosure, the interface of the signal receiving component 12 may be designed to be compatible. In this way, if it is necessary to further optimize the positioning performance and cost of the electronic apparatus, it is only necessary to re-optimize the arrangement design of the sensors on the signal receiving component and obtain the signal receiving components having different sensor layouts as required, thereby further reducing the designing cost of the electronic apparatus. In addition, by setting the signal receiving component 12 in a removable way, the process of maintenance or disassembly can be more convenient.

Figure 8:
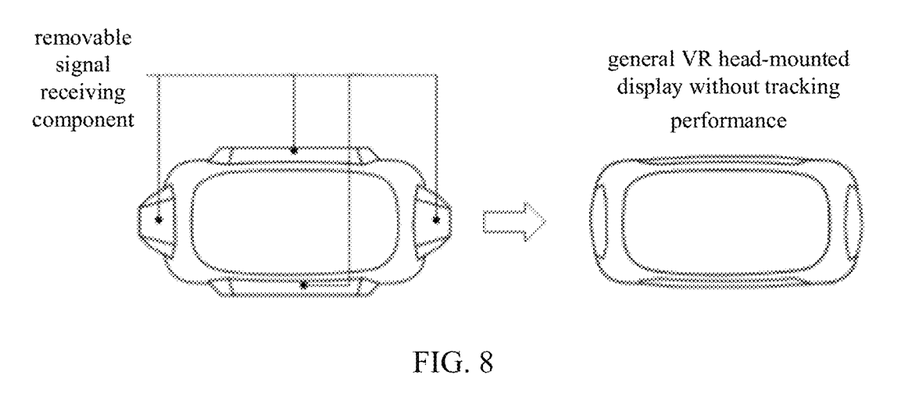
FIG. 8 shows a schematic structural diagram of an electronic apparatus before and after the signal receiving components are removed according to an embodiment of the present disclosure.

FIG. 8 shows a schematic structural diagram of an electronic apparatus before and after a signal receiving component is removed according to an embodiment of the present disclosure.

Referring to FIG. 8, when a user does not need a tracking and positioning function, all signal receiving components can be easily disassembled. The electronic apparatus thus obtained can be used as a general VR/AR head-mounted display. As a result, different users' needs can be met, and the adaptability of the electronic apparatus can be enhanced and the design cost can be reduced. In an exemplary embodiment of the present disclosure, the electronic apparatus may be, for example, virtual reality glasses including various components as described above, which is not repeated herein.

The electronic apparatus provided by the embodiments of the present disclosure can achieve high-accuracy positioning in space and has high adaptability and easy maintenance.

An embodiment of the present disclosure also provides a spatial positioning system. The spatial positioning system may include: a signal emitting source configured to emit a source signal; and the electronic apparatus described according to the above embodiments.

Figure 9:
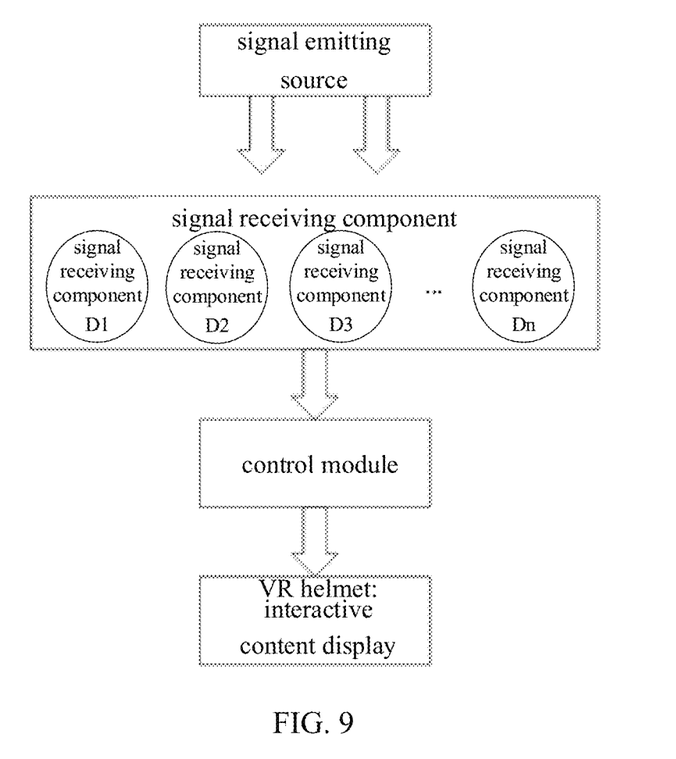
FIG. 9 shows a spatial positioning implementation principle according to an embodiment of the present disclosure.

FIG. 9 shows a spatial positioning implementation principle according to an embodiment of the present disclosure. Referring to FIG. 9, the signal emitting source may emit a source signal (for example, an infrared signal). The signal receiving component 12 may be mounted on a VR helmet. The signal receiving device 122 on the signal receiving component 12 can receive the infrared signal and generate a first signal according to the received infrared signal. Then, the signal receiving device 122 may input information such as the first signal and the time when the infrared signal was received into the control module. The control module performs calculation through an algorithm to obtain the position condition of the VR apparatus in the space, and feeds it back to the VR helmet, so as to notify the display screen for interactive display.

It should be understood that the signal emitting source may be referred to as a base station, which is used as a device that emits a signal (i.e., a source signal) in real time when the electronic apparatus is operating. The region covered by the source signal emitted from the signal emitting source may include the entire active region of the electronic apparatus. As an example, the type of the signal emitted by the signal emitting source may include an optical signal, an electrical signal, or an acoustic signal.

It should be noted that the signal receiving component needs to match the type of the signal emitted by the signal emitting source, so as to ensure that it can receive the corresponding type of signal. In addition, after the signal receiving component receives any of the above types of source signals, the signals need to be converted into electrical signals (i.e., the first signal), which is then transmitted to the control module. Thus, it is convenient for the control module to perform processing quickly, and then obtain information such as the spatial position of the electronic apparatus and the motion trajectory of the electronic apparatus quickly.

Figure 10:
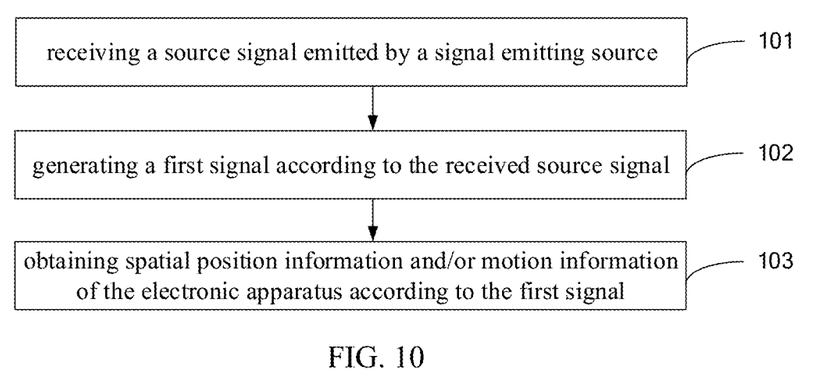
FIG. 10 shows a flowchart of a method for spatial positioning according to an embodiment of the present disclosure.

An embodiment of the present disclosure also provides a method for performing spatial positioning by the electronic apparatus described according to the above embodiments. FIG. 10 shows a flowchart of a method for spatial positioning according to an embodiment of the present disclosure.

The method may include steps 101 to 103.

In step 101, a source signal emitted by a signal emitting source is received.

Specifically, step 101 may be performed by a signal receiving device in the signal receiving component.

In step 102, a first signal is generated according to the received source signal.

Specifically, this step may be performed by the signal receiving device in the signal receiving component.

In step 103, space position information and/or motion information of the electronic apparatus is obtained according to the first signal.

Specifically, this step may be performed by a control module in the electronic apparatus.

In an exemplary embodiment of the present disclosure, before step 103, the above method may further include: obtaining initial position information and initial orientation information of the electronic apparatus.

Specifically, the initial position information and the initial orientation information may be represented by data as shown in FIG. 5. As an example, this data may be stored in the control module in advance.

Accordingly, step 103 may specifically include: obtaining the spatial position information and/or the motion information of the electronic apparatus according to an amplitude and a generating time of the first signal, and the initial position information and the initial orientation information of the electronic apparatus.

The foregoing description of the embodiment has been provided for purpose of illustration and description. It is not intended to be exhaustive or to limit the application. Even if not specifically shown or described, individual elements or features of a particular embodiment are generally not limited to that particular embodiment, are interchangeable when under a suitable condition, can be used in a selected embodiment and may also be varied in many ways. Such variations are not to be regarded as a departure from the application, and all such modifications are included within the scope of the application.

What is claimed is:

1. An electronic apparatus, comprising:
a body having a central region and a peripheral region surrounding the central region; and a plurality of signal receiving components disposed in the peripheral region of the body, wherein the signal receiving component comprises a circuit board and a plurality of signal receiving devices located on the circuit board,
wherein the plurality of signal receiving components comprise a first signal receiving component, a second signal receiving component, a third signal receiving component, and a fourth signal receiving component, wherein the first signal receiving component and the second signal receiving component are oppositely disposed in the peripheral region along a first direction, wherein the third signal receiving component and the fourth signal receiving component are oppositely disposed in the peripheral region along a second direction, wherein the first direction and the second direction are perpendicular to each other,
wherein the electronic apparatus is virtual reality glasses, wherein the first signal receiving component and the second receiving component each comprise a first preset number of signal receiving devices, wherein the signal receiving device in the first signal receiving component and the signal receiving device in the second receiving component are symmetrical with respect to a center line penetrating through the center region along the second direction, and wherein the first preset number is 7,
where the third signal receiving component and the fourth receiving component each comprise a second preset number of signal receiving devices, wherein the signal receiving device in the third signal receiving component and the signal receiving device in the fourth receiving component are symmetrical with respect to a center line penetrating through the center region along the first direction, and wherein the second preset number is 8,
wherein the electronic apparatus further comprises a control module coupled to the plurality of signal receiving components, wherein the signal receiving device is configured to receive a source signal emitted by a signal emitting source and generate a first signal according to the received source signal, wherein the circuit board is configured to transmit the first signal to the control module, and wherein the control module is configured to obtain spatial position information and/or motion information of the electronic apparatus according to the first signal, and
wherein the signal receiving component is removably attached to the body, wherein the signal receiving device comprises a photodiode, and wherein the circuit board comprises a flexible printed circuit board.

2. The electronic apparatus according to claim 1, wherein the plurality of signal receiving devices are disposed on the circuit board and towards different directions.

3. The electronic apparatus according to claim 2, wherein, in the signal receiving component, mounting planes of at least any four of the signal receiving devices are not located on the same plane.

4. The electronic apparatus according to claim 3, wherein in the signal receiving component, an angle between the mounting planes of the adjacent signal receiving devices is greater than or equal to 120 degrees.

5. The electronic apparatus according to claim 4, wherein the mounting plane of the signal receiving device is a signal receiving surface of the signal receiving device.

6. A spatial positioning system, comprising:
   a signal emitting source configured to emit a source signal; and
   the electronic apparatus according to claim 2.

7. A spatial positioning system, comprising:
   a signal emitting source configured to emit a source signal; and
   the electronic apparatus according to claim 1.

8. The spatial positioning system according to claim 7, wherein the source signal comprises an optical signal, an electrical signal, or an acoustic signal.

9. A method for performing spatial positioning using the electronic apparatus according to claim 1, comprising:
   receiving a source signal emitted by a signal emitting source; generating a first signal according to the received source signal; and
   obtaining spatial position information and/or motion information of the electronic apparatus according to the first signal.

10. The method according to claim 9, further comprising:
   before obtaining the spatial position information and/or the motion information of the electronic apparatus according to the first signal, obtaining initial position information and initial orientation information of the electronic apparatus, wherein obtaining the spatial position information and/or the motion information of the electronic apparatus according to the first signal comprises: obtaining the spatial position information and/or the motion information of the electronic apparatus according to an amplitude and a generating time of the first signal, and the initial position information and the initial orientation information of the electronic apparatus.

* * * * *

UNITED STATES PATENT AND TRADEMARK OFFICE
CERTIFICATE OF CORRECTION

| | | |
|---|---|---|
| PATENT NO. | : 11,249,545 B2 | Page 1 of 1 |
| APPLICATION NO. | : 16/824914 | |
| DATED | : February 15, 2022 | |
| INVENTOR(S) | : Chao Zheng et al. | |

It is certified that error appears in the above-identified patent and that said Letters Patent is hereby corrected as shown below:

On the Title Page

Item (30) Please add:
"Foreign Application Priority Data" as "September 4, 2019 (CN) ........................201910845375.0"

Signed and Sealed this
Thirteenth Day of June, 2023

Katherine Kelly Vidal
*Director of the United States Patent and Trademark Office*